United States Patent
Nakashima et al.

(10) Patent No.: US 11,651,690 B2
(45) Date of Patent: May 16, 2023

(54) CONTROL APPARATUS, SYSTEM, VEHICLE, AND VEHICLE CONTROL METHOD

(71) Applicant: TOYOTA JIDOSHA KABUSHIKI KAISHA, Toyota (JP)

(72) Inventors: Toyokazu Nakashima, Nagoya (JP); Shunsuke Sagara, Nisshin (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/545,723

(22) Filed: Dec. 8, 2021

(65) Prior Publication Data

US 2022/0180746 A1  Jun. 9, 2022

(30) Foreign Application Priority Data

Dec. 9, 2020 (JP) .............................. JP2020-204434

(51) Int. Cl.
| | |
|---|---|
| G08G 1/14 | (2006.01) |
| B60R 25/24 | (2013.01) |
| B60R 25/102 | (2013.01) |
| B60R 25/045 | (2013.01) |
| B60R 21/01 | (2006.01) |
| B60R 25/25 | (2013.01) |

(52) U.S. Cl.
CPC .............. *G08G 1/146* (2013.01); *B60R 21/01* (2013.01); *B60R 25/045* (2013.01); *B60R 25/102* (2013.01); *B60R 25/24* (2013.01); *B60R 25/25* (2013.01); *B60R 2021/01272* (2013.01)

(58) Field of Classification Search
CPC ...... G08G 1/146; B60R 21/01; B60R 25/045; B60R 25/102; B60R 25/24; B60R 25/25; B60R 2021/01272
See application file for complete search history.

(56) References Cited

U.S. PATENT DOCUMENTS

| | | | | |
|---|---|---|---|---|
| 3,639,897 A | * | 2/1972 | Teich | ..................... B60R 25/10 340/522 |
| 6,133,855 A | * | 10/2000 | Kim | ....................... B60Q 9/002 340/988 |
| 6,864,784 B1 | * | 3/2005 | Loeb | ................ G08G 1/096716 340/936 |
| 2007/0200688 A1 | * | 8/2007 | Tang | .................. B60R 25/1004 455/1 |

FOREIGN PATENT DOCUMENTS

| | | | |
|---|---|---|---|
| JP | 2004-110463 A | | 4/2004 |
| JP | 2007010494 A | * | 1/2007 |
| KR | 950008902 A | * | 4/1995 |

* cited by examiner

*Primary Examiner* — Kam Wan Ma
(74) *Attorney, Agent, or Firm* — Oliff PLC

(57) ABSTRACT

A control apparatus includes a controller configured to, upon detecting parking of a vehicle at a spot where parking is prohibited, generate control data for controlling the vehicle to prevent a state of the vehicle from transitioning to a state in which a power source of the vehicle is stopped and an occupant of the vehicle is out of the vehicle, and output the generated control data.

15 Claims, 5 Drawing Sheets

CONTROL APPARATUS, SYSTEM, VEHICLE, AND VEHICLE CONTROL METHOD

CROSS-REFERENCE TO RELATED APPLICATION

This application claims priority to Japanese Patent Application No. 2020-204434, filed on Dec. 9, 2020, the entire contents of which are incorporated herein by reference.

TECHNICAL FIELD

The present disclosure relates to a control apparatus, a system, a vehicle, and a vehicle control method.

BACKGROUND

Patent Literature (PTL) 1 discloses a system for determining whether a vehicle parked in a no parking area meets a parking permission condition, and notifying a renter or manager of the area, an owner of the vehicle, or the police of the fact of parking in a case in which the vehicle is determined not to meet the parking permission condition.

CITATION LIST

Patent Literature

PTL 1: JP 2004-110463 A

SUMMARY

With the system disclosed in PTL 1, it is difficult to prevent unauthorized parking, such as illegal parking.

It would be helpful to facilitate prevention of unauthorized parking.

A control apparatus according to the present disclosure includes a controller configured to:

upon detecting parking of a vehicle at a spot where parking is prohibited, generate control data for controlling the vehicle to prevent a state of the vehicle from transitioning to a state in which a power source of the vehicle is stopped and an occupant of the vehicle is out of the vehicle; and output the generated control data.

A vehicle control method according to the present disclosure includes:

when parking of a vehicle at a spot where parking is prohibited is detected, generating, by a control apparatus, control data for controlling the vehicle to prevent a state of the vehicle from transitioning to a state in which a power source of the vehicle is stopped and an occupant of the vehicle is out of the vehicle; and outputting the generated control data from the control apparatus.

According to the present disclosure, it is possible to facilitate prevention of unauthorized parking.

DETAILED DESCRIPTION

Figure 1:
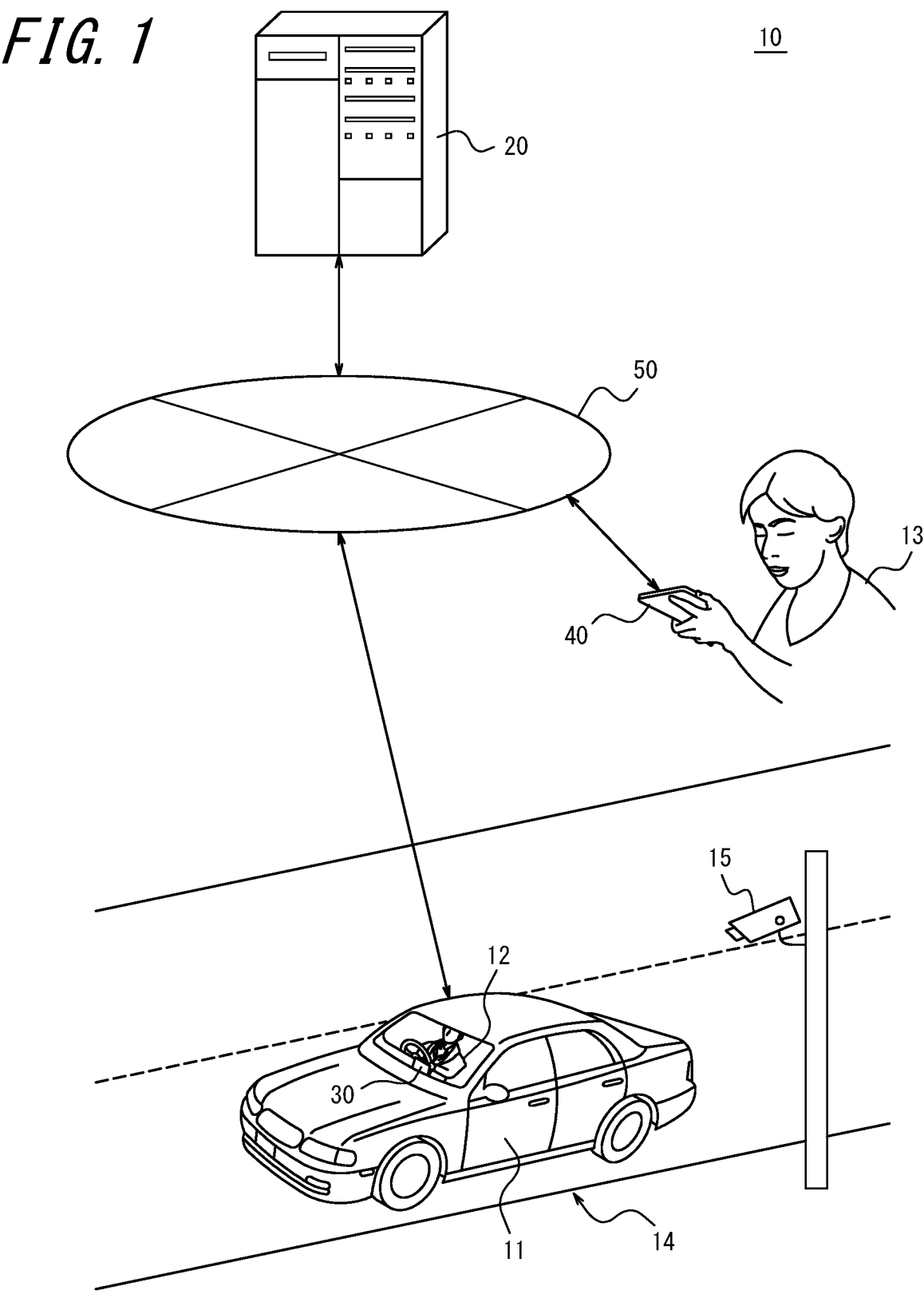
FIG. 1 is a diagram illustrating a configuration of a system according to an embodiment of the present disclosure.

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

A configuration of a system 10 according to the present embodiment will be described with reference to FIG. 1.

The system 10 according to the present embodiment includes at least one control apparatus 20, at least one in-vehicle apparatus 30, and at least one terminal apparatus 40. The control apparatus 20 can communicate with the in-vehicle apparatus 30 and the terminal apparatus 40 via a network 50. The in-vehicle apparatus 30 may be able to communicate with the terminal apparatus 40 via the network 50.

The control apparatus 20 is installed in a facility such as a data center. The control apparatus 20 is a computer such as a server that belongs to a cloud computing system or another type of computing system.

The in-vehicle apparatus 30 is mounted in a vehicle 11. The in-vehicle apparatus 30 may be used by an occupant 12 of the vehicle 11, such as a driver. The in-vehicle apparatus 30 is a computer capable of controlling components of the vehicle 11. The vehicle 11 is, for example, any type of automobile such as a gasoline vehicle, a diesel vehicle, an HEV, a PHEV, a BEV, or an FCEV. The term "HEV" is an abbreviation of hybrid electric vehicle. The term "PHEV" is an abbreviation of plug-in hybrid electric vehicle. The term "BEV" is an abbreviation of battery electric vehicle. The term "FCEV" is an abbreviation of fuel cell electric vehicle. The vehicle 11 is driven by a driver in the present embodiment, but the driving may be automated at any level. The automation level is, for example, any one of Level 1 to Level 5 according to the level classification defined by SAE. The name "SAE" is an abbreviation of Society of Automotive Engineers.

The terminal apparatus 40 is used by an owner 13 of the vehicle 11. The terminal apparatus 40 is, for example, a mobile device such as a mobile phone, a smartphone, or a tablet, or a PC. The term "PC" is an abbreviation of personal computer.

The network 50 includes the Internet, at least one WAN, at least one MAN, or any combination thereof. The term "WAN" is an abbreviation of wide area network. The term "MAN" is an abbreviation of metropolitan area network. The network 50 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation of local area network.

An outline of the present embodiment will be described with reference to FIG. 1.

Upon detecting parking of the vehicle 11 at a spot 14 where parking is prohibited, the control apparatus 20 generates control data D1. The control data D1 is data for controlling the vehicle 11 to prevent the state of the vehicle 11 from transitioning to a state in which a power source of the vehicle 11 is stopped and the occupant 12 of the vehicle 11 is out of the vehicle 11. The control apparatus 20 outputs the generated control data D1. Specifically, the control apparatus 20 transmits, namely, outputs the control data D1 to the in-vehicle apparatus 30 via the network 50. The in-vehicle apparatus 30 receives the control data D1 from the control apparatus 20. The in-vehicle apparatus 30 controls the vehicle 11 based on the received control data D1. Therefore, according to the present embodiment, it is possible to facilitate prevention of unauthorized parking.

As the method for detecting parking of the vehicle 11, any method may be used, but in the present embodiment, a method is used in which a position of the vehicle 11 measured by the in-vehicle apparatus 30 is checked to determine whether the vehicle 11 is parked at the spot 14. For improved accuracy, a position of the occupant 12 measured by a mobile device, such as a mobile phone, a smartphone, or a tablet, of the occupant 12 may further be checked. As an alternative method, a method may be used in which an image captured by a camera 15 installed in the vicinity of the spot 14 is analyzed to determine whether the vehicle 11 is parked at the spot 14. As the image analysis method, a known method can be used. Machine learning, such as deep learning, may be used.

In the present embodiment, the control data D1 includes a first instruction to disable an operation for stopping the power source, such as an engine or an motor, of the vehicle 11. If the vehicle 11 is controlled in accordance with the first instruction and the occupant 12 is unable to stop the power source, the occupant 12 is less likely to leave the vehicle 11. As a result, unauthorized parking can be prevented.

As a variation of the present embodiment, the control data D1 may include, instead of or together with the first instruction, a second instruction to lock a seat belt of the vehicle 11. If the vehicle 11 is controlled in accordance with the second instruction and the occupant 12 is unable to unbuckle the seat belt, the occupant 12 is not able to get out of the vehicle 11. As a result, unauthorized parking can be prevented.

As another variation of the present embodiment, the control data D1 may include, instead of the first or second instruction or together with the first or second instruction, a third instruction to lock a door of the vehicle 11. If the vehicle 11 is controlled in accordance with the third instruction and the occupant 12 is unable to open the door, the occupant 12 is not able to get out of the vehicle 11. As a result, unauthorized parking can be prevented.

Figure 2:
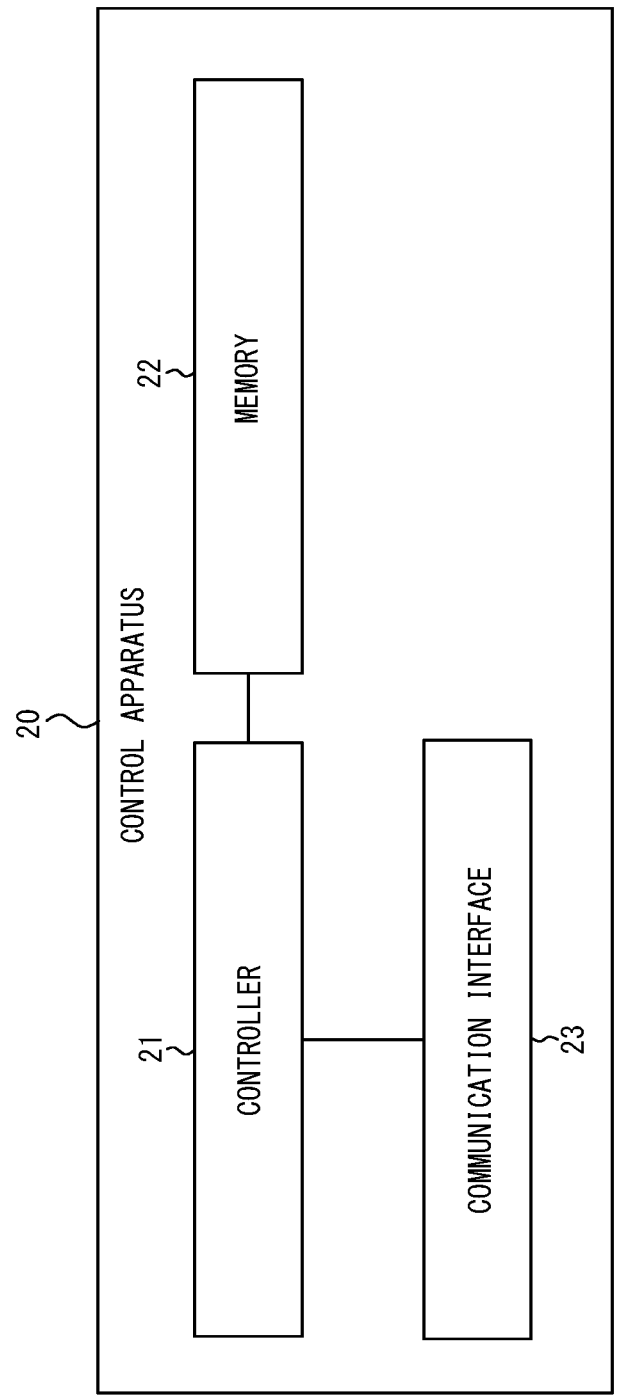
FIG. 2 is a block diagram illustrating a configuration of a control apparatus according to the embodiment of the present disclosure.

A configuration of the control apparatus 20 according to the present embodiment will be described with reference to FIG. 2.

The control apparatus 20 includes a controller 21, a memory 22, and a communication interface 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 21 executes processes related to operations of the control apparatus 20 while controlling components of the control apparatus 20.

The memory 22 includes at least one semiconductor memory, at least one magnetic memory, at least one optical memory, or any combination thereof. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 22 functions as, for example, a main memory, an auxiliary memory, or a cache memory. The memory 22 stores data to be used for the operations of the control apparatus 20 and data obtained by the operations of the control apparatus 20.

The communication interface 23 includes at least one interface for communication. The interface for communication is, for example, a LAN interface. The communication interface 23 receives data to be used for the operations of the control apparatus 20, and transmits data obtained by the operations of the control apparatus 20.

The functions of the control apparatus 20 are realized by execution of a first program according to the present embodiment by a processor serving as the controller 21. That is, the functions of the control apparatus 20 are realized by software. The first program causes a computer to execute the operations of the control apparatus 20, thereby causing the computer to function as the control apparatus 20. That is, the computer executes the operations of the control apparatus 20 in accordance with the first program to thereby function as the control apparatus 20.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the control apparatus 20 may be realized by a programmable circuit or a dedicated circuit serving as the controller 21. That is, some or all of the functions of the control apparatus 20 may be realized by hardware.

Figure 3:
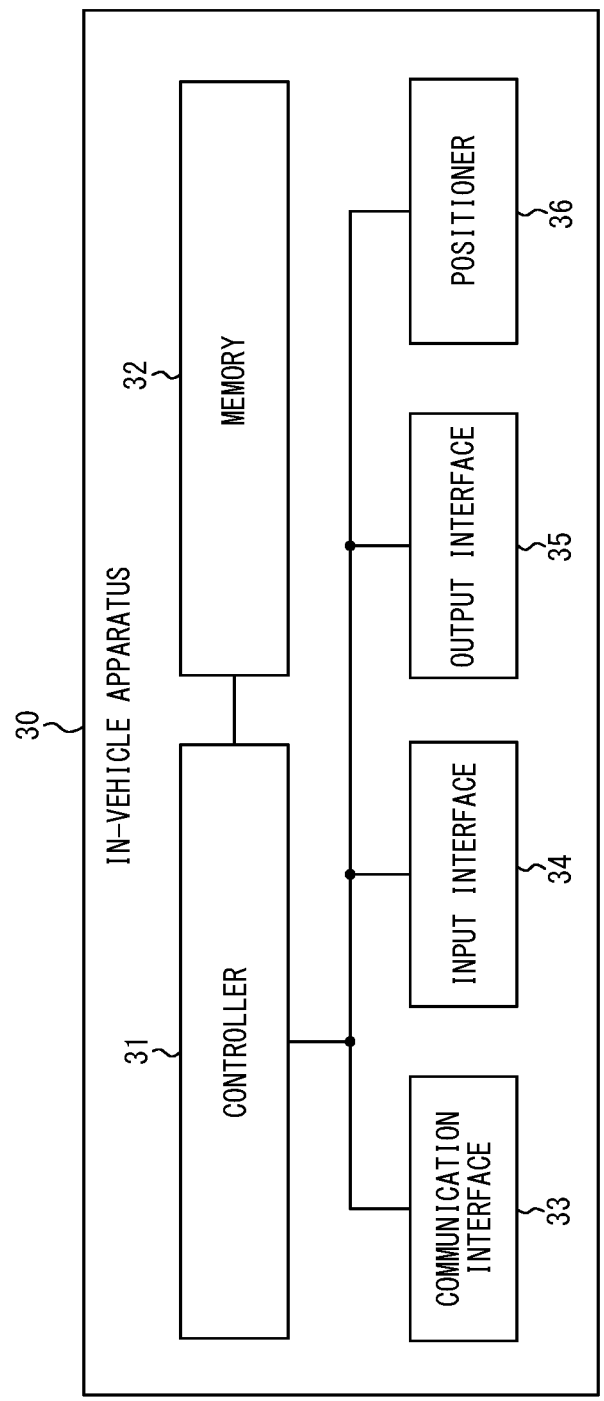
FIG. 3 is a block diagram illustrating a configuration of an in-vehicle apparatus according to the embodiment of the present disclosure.

A configuration of the in-vehicle apparatus 30 according to the present embodiment will be described with reference to FIG. 3.

The in-vehicle apparatus 30 includes a controller 31, a memory 32, a communication interface 33, an input interface 34, an output interface 35, and a positioner 36.

The controller 31 includes at least one processor, at least one programmable circuit, at least one dedicated circuit, or any combination thereof. The processor is a general purpose processor such as a CPU or a GPU, or a dedicated processor that is dedicated to specific processing. The programmable circuit is, for example, an FPGA. The dedicated circuit is, for example, an ASIC. The controller 31 may include at least one ECU. The term "ECU" is an abbreviation of electronic control unit. The controller 31 executes processes related to operations of the in-vehicle apparatus 30 while controlling components of the in-vehicle apparatus 30.

The memory 32 includes at least one semiconductor memory, at least one magnetic memory, at least one optical memory, or any combination thereof. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores data to be used for the operations of the in-vehicle apparatus 30 and data obtained by the operations of the in-vehicle apparatus 30.

The communication interface 33 includes at least one interface for communication. The interface for communication is, for example, an interface compliant with a mobile communication standard such as LTE, the 4G standard, or the 5G standard, an interface compliant with a short-range wireless communication standard such as Bluetooth® (Bluetooth is a registered trademark in Japan, other countries, or both), or a LAN interface. The term "LTE" is an abbreviation of Long Term Evolution. The term "4G" is an abbreviation of 4th generation. The term "5G" is an abbreviation of 5th generation. The communication interface 33 may include an interface compliant with an in-vehicle communication standard such as CAN. The term "CAN" is an abbreviation of Controller Area Network. The communication interface 33 receives data to be used for the operations of the in-vehicle apparatus 30, and transmits data obtained by the operations of the in-vehicle apparatus 30.

The input interface 34 includes at least one interface for input. The interface for input is, for example, a physical key, a capacitive key, a pointing device, a touch screen integrally provided with a display, a camera, or a microphone. The input interface 34 accepts an operation for inputting data to be used for the operations of the in-vehicle apparatus 30. The input interface 34, instead of being included in the in-vehicle apparatus 30, may be connected to the in-vehicle apparatus 30 as an external input device. As an interface for connection, for example, an interface compliant with a standard such as USB, HDMI® (HDMI is a registered trademark in Japan, other countries, or both), or Bluetooth® can be used. The term "USB" is an abbreviation of Universal Serial Bus. The term "HDMI®" is an abbreviation of High-Definition Multimedia Interface.

The output interface 35 includes at least one interface for output. The interface for output is, for example, a display or a speaker. The display is, for example, an LCD or an organic EL display. The term "LCD" is an abbreviation of liquid crystal display. The term "EL" is an abbreviation of electro luminescence. The output interface 35 outputs data obtained by the operations of the in-vehicle apparatus 30. The output interface 35, instead of being included in the in-vehicle apparatus 30, may be connected to the in-vehicle apparatus 30 as an external output device. As an interface for connection, for example, an interface compliant with a standard such as USB, HDMI®, or Bluetooth® can be used.

The positioner 36 includes at least one GNSS receiver. The term "GNSS" is an abbreviation of global navigation satellite system. GNSS is, for example, GPS, QZSS, BDS, GLONASS, or Galileo. The term "GPS" is an abbreviation of Global Positioning System. The term "QZSS" is an abbreviation of Quasi-Zenith Satellite System. QZSS satellites are called quasi-zenith satellites. The term "BDS" is an abbreviation of BeiDou Navigation Satellite System. The term "GLONASS" is an abbreviation of Global Navigation Satellite System. The positioner 36 measures the position of the in-vehicle apparatus 30 as the position of the vehicle 11.

The functions of the in-vehicle apparatus 30 are realized by execution of a second program according to the present embodiment by a processor serving as the controller 31. That is, the functions of the in-vehicle apparatus 30 are realized by software. The second program causes a computer to execute the operations of the in-vehicle apparatus 30, thereby causing the computer to function as the in-vehicle apparatus 30. That is, the computer executes the operations of the in-vehicle apparatus 30 in accordance with the second program to thereby function as the in-vehicle apparatus 30.

Some or all of the functions of the in-vehicle apparatus 30 may be realized by a programmable circuit or a dedicated circuit serving as the controller 31. That is, some or all of the functions of the in-vehicle apparatus 30 may be realized by hardware.

Figure 4:
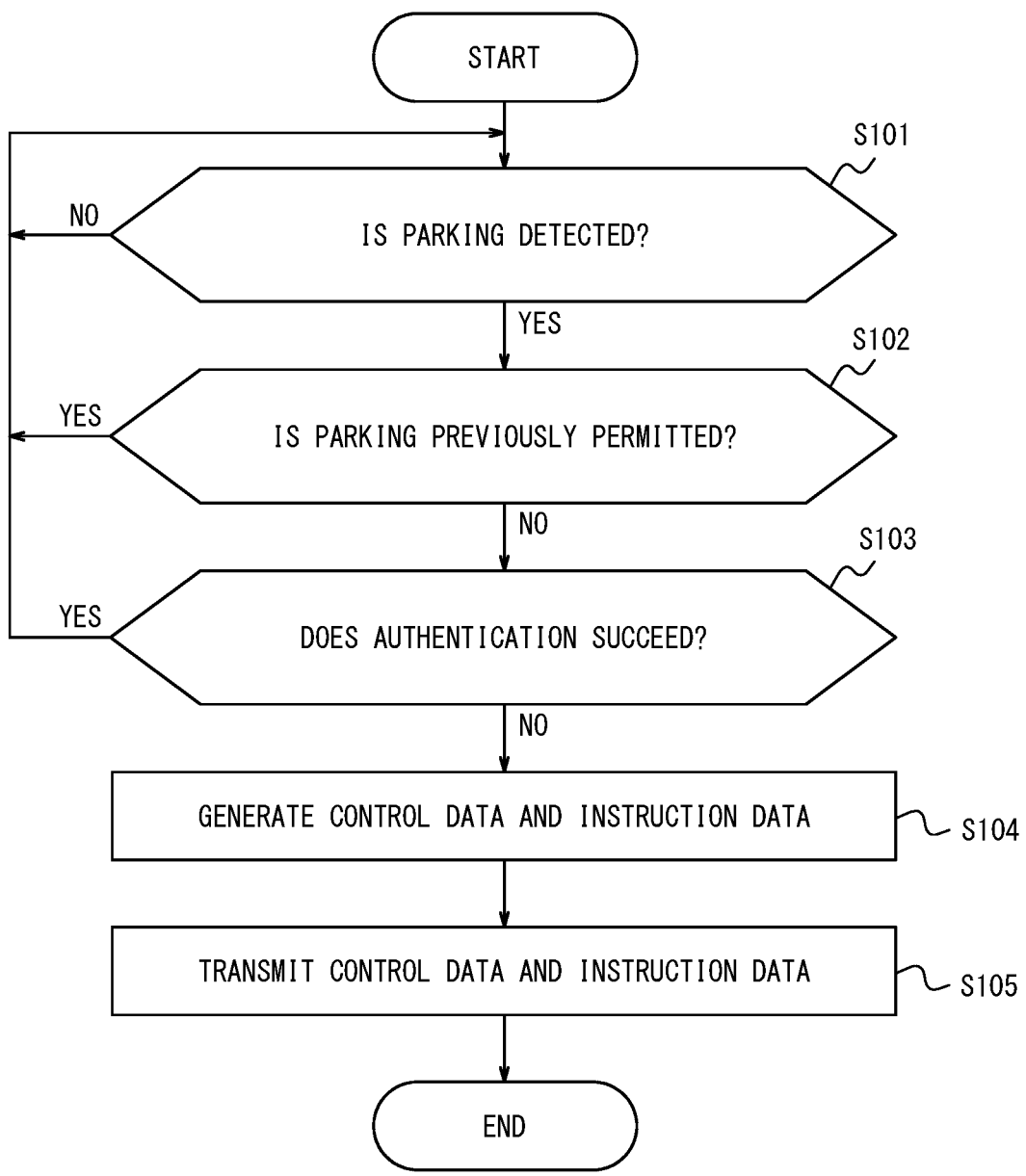
FIG. 4 is a flowchart illustrating operations of the control apparatus according to the embodiment of the present disclosure.
Figure 5:
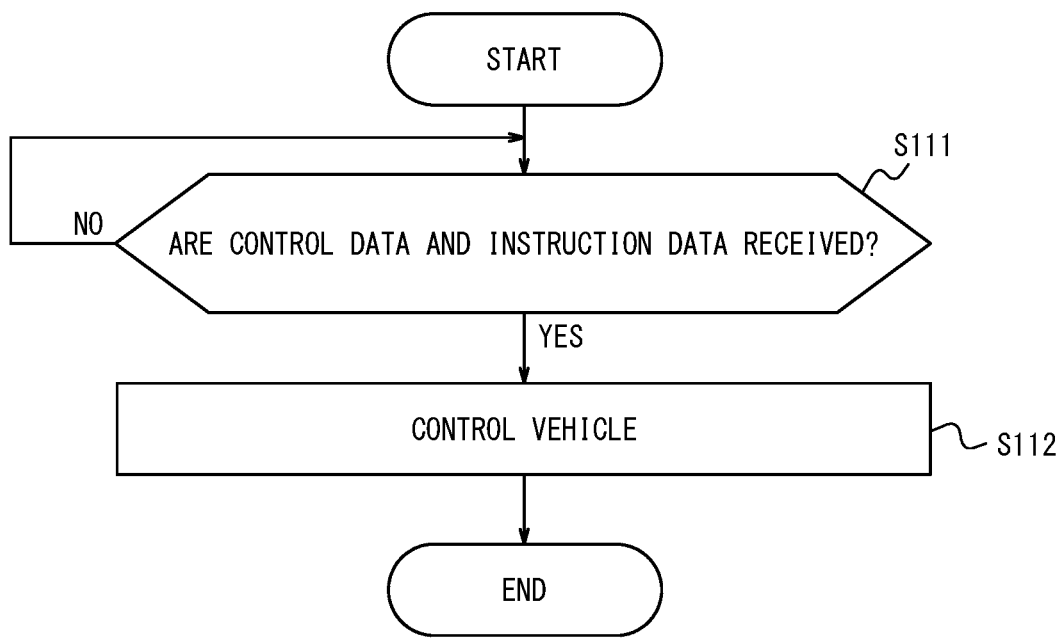
FIG. 5 is a flowchart illustrating operations of the in-vehicle apparatus according to the embodiment of the present disclosure.

Operations of the system 10 according to the present embodiment will be described with reference to FIGS. 4 and 5. These operations correspond to a vehicle control method according to the present embodiment. FIG. 4 illustrates operations of the control apparatus 20. FIG. 5 illustrates operations of the in-vehicle apparatus 30.

In step S101 of FIG. 4, the communication interface 23 of the control apparatus 20 receives positional data D2 from the in-vehicle apparatus 30. The positional data D2 is data indicating a position of the vehicle 11 measured by the positioner 36 of the in-vehicle apparatus 30. The controller 21 of the control apparatus 20 acquires the positional data D2 received by the communication interface 23. The controller 21 determines, with reference to map data D3, whether the position of the vehicle 11 indicated by the acquired positional data D2 matches the spot 14 where parking is prohibited. The map data D3 is data defining the spot 14. The spot 14 may be an area where parking is legally prohibited, or an area where parking is privately prohibited, such as in front of a personal house. The map data D3 may be stored in advance in the memory 22 of the control apparatus 20, or may be accumulated in an external system such as an Internet-based GIS. The term "GIS" is an abbreviation of geographic information system. In a case in which the position of the vehicle 11 matches the spot 14, the controller 21 determines that the vehicle 11 is parked at the spot 14. That is, the controller 21 detects parking of the vehicle 11 at the spot 14. In that case, the process in step S102 is executed. In a case in which the position of the vehicle 11 does not match the spot 14, the controller 21 determines that the vehicle 11 is not parked at the spot 14. In that case, the process in step S101 is executed again.

In step S102 of FIG. 4, the controller 21 of the control apparatus 20 refers to permission data D4 indicating whether parking of the vehicle 11 at the spot 14 is previously permitted for the vehicle 11. For example, the permission data D4 includes data indicating, in a case in which the spot 14 is an area where parking is legally prohibited, whether parking of the vehicle 11 in the area is specifically permitted by the police. Alternatively, the permission data D4 includes data indicating, in a case in which the spot 14 is in front of a personal house, whether parking of the vehicle 11 in front of the house is approved by a resident. Alternatively, the permission data D4 includes data indicating whether parking of the vehicle 11 at the spot 14 is exceptionally permitted in an emergency situation such as an accident or an evacuation. The permission data D4 is stored in advance in the memory 22 of the control apparatus 20 or in external storage. Alternatively, the permission data D4 is transmitted from the terminal apparatus 40, and received by the communication interface 23 of the control apparatus 20. In a case in which parking of the vehicle 11 at the spot 14 is not previously permitted for the vehicle 11, the process in step S103 is executed. In a case in which the parking is previously permitted for the vehicle 11, the process in step S101 is executed again.

In step S103 of FIG. 4, the communication interface 23 of the control apparatus 20 receives authentication data D5 inputted by the occupant 12 of the vehicle 11 from a mobile device, such as a mobile phone, a smartphone, or a tablet, of the occupant 12, or from the in-vehicle apparatus 30. The authentication data D5 may be secret data such as a personal identification number or a password, or cryptographic data such as a cryptographic key. The controller 21 of the control apparatus 20 acquires the authentication data D5 received by the communication interface 23. The controller 21 performs authentication using the acquired authentication data D5. Specifically, the controller 21 compares the authentication data D5 with authentication data, which is registered in advance in a database, for one or more users who are allowed to park at the spot 14. In a case in which the authentication data D5 does not match authentication data for any of the users, the controller 21 determines that the occupant 12 is not allowed to park at the spot 14. That is, the authentication fails. In that case, the process in step S104 is executed. In a case in which the authentication data D5 matches authentication data for one of the users, the controller 21 determines that the occupant 12 is allowed to park at the spot 14. That is, the authentication succeeds. In that case, the process in step S101 is executed again.

In step S104 of FIG. 4, the controller 21 of the control apparatus 20 generates control data D1 and instruction data D6. The control data D1 is data for controlling the vehicle 11 to prevent the state of the vehicle 11 from transitioning to a state in which a power source of the vehicle 11 is stopped and the occupant 12 of the vehicle 11 is out of the vehicle 11. In the present embodiment, the control data D1 is data including a first instruction to disable an operation for stopping the power source of the vehicle 11, such as an operation for turning off the ignition of the vehicle 11, but may be data including another instruction. The control data D1 may be data including, as another instruction, a second instruction to lock a seat belt of the vehicle 11, or a third instruction to lock a door of the vehicle 11. The instruction data D6 is data instructing that an alert be presented from the vehicle 11 to the outside. Specifically, the instruction data D6 is data instructing that an alert message be displayed on an external display of the vehicle 11, that the hazard lights of the vehicle 11 be flashed, that the horn or siren of the vehicle 11 be sounded, or any combination thereof.

In step S105 of FIG. 4, the controller 21 of the control apparatus 20 outputs the control data D1 and the instruction data D6 generated in step S104. Specifically, the controller 21 controls the communication interface 23 to transmit the control data D1 and the instruction data D6. The communication interface 23 transmits the control data D1 and the instruction data D6 to the in-vehicle apparatus 30.

When the control data D1 and the instruction data D6 are transmitted, in step S111 of FIG. 5, the communication interface 33 of the in-vehicle apparatus 30 receives the control data D1 and the instruction data D6 from the control apparatus 20. The controller 31 of the in-vehicle apparatus 30 acquires the control data D1 and the instruction data D6 that are received by the communication interface 33.

In step S112 of FIG. 5, the controller 31 of the in-vehicle apparatus 30 controls the vehicle 11 based on the control data D1 and the instruction data D6 that are acquired in step S111. Specifically, the controller 31 controls the vehicle 11 based on the control data D1 to prevent the state of the vehicle 11 from transitioning to a state in which the power source of the vehicle 11 is stopped and the occupant 12 of the vehicle 11 is out of the vehicle 11. The controller 31 controls the vehicle 11 based on the instruction data D6 to present an alert from the vehicle 11 to the outside. More specifically, the controller 31 disables the operation for stopping the power source of the vehicle 11 in accordance with the first instruction included in the control data D1. The controller 31 displays an alert message on an external display of the vehicle 11 in accordance with instructions included in the instruction data D6. Alternatively, the controller 31 flashes the hazard lights of the vehicle 11. Alternatively, the controller 31 sounds the horn or siren of the vehicle 11.

As described above, in the present embodiment, the controller 21 of the control apparatus 20, upon detecting parking of the vehicle 11 at the spot 14 where parking is prohibited, generates control data D1 for controlling the vehicle 11 to prevent the state of the vehicle 11 from transitioning to a state in which a power source of the vehicle 11 is stopped and the occupant 12 of the vehicle 11 is out of the vehicle 11. The controller 21 outputs the generated control data D1. Therefore, according to the present embodiment, it is possible to facilitate prevention of unauthorized parking.

In the present embodiment, even when detecting parking of the vehicle 11 at the spot 14, the controller 21 of the control apparatus 20 does not output the control data D1 in a case in which the parking is previously permitted for the vehicle 11. Therefore, according to the present embodiment, it is possible to avoid a situation in which parking that is authorized is prevented.

In the present embodiment, even when detecting parking of the vehicle 11 at the spot 14, the controller 21 of the control apparatus 20 does not output the control data D1 in a case in which valid authentication data is inputted by the occupant 12. Therefore, according to the present embodiment, it is possible to avoid a situation in which parking that is authorized is prevented.

As a variation of the present embodiment, in step S101 of FIG. 4, not only whether the position of the vehicle 11 matches the spot 14, but also whether the speed of the vehicle 11 is zero may be determined. In such a variation, the controller 21 of the control apparatus 20 determines that the vehicle 11 is parked at the spot 14, in a case in which the position of the vehicle 11 matches the spot 14 and the speed of the vehicle 11 is zero. That is, the controller 21 detects parking of the vehicle 11 at the spot 14.

As a variation of the present embodiment, in or after step S104 of FIG. 4, the parking of the vehicle 11 at the spot 14 may be reported to the police. In such a variation, the controller 21 of the control apparatus 20 controls the communication interface 23 to transmit report data D7. The report data D7 is data reporting that the vehicle 11 is parked at the spot 14. The communication interface 23 transmits the report data D7 to a server apparatus or terminal apparatus of the police.

As a variation of the present embodiment, a method for enabling to contact the owner 13 of the vehicle 11, in a case in which the vehicle 11 is parked at the spot 14, may be provided. Such a variation will be described.

Figure 6:
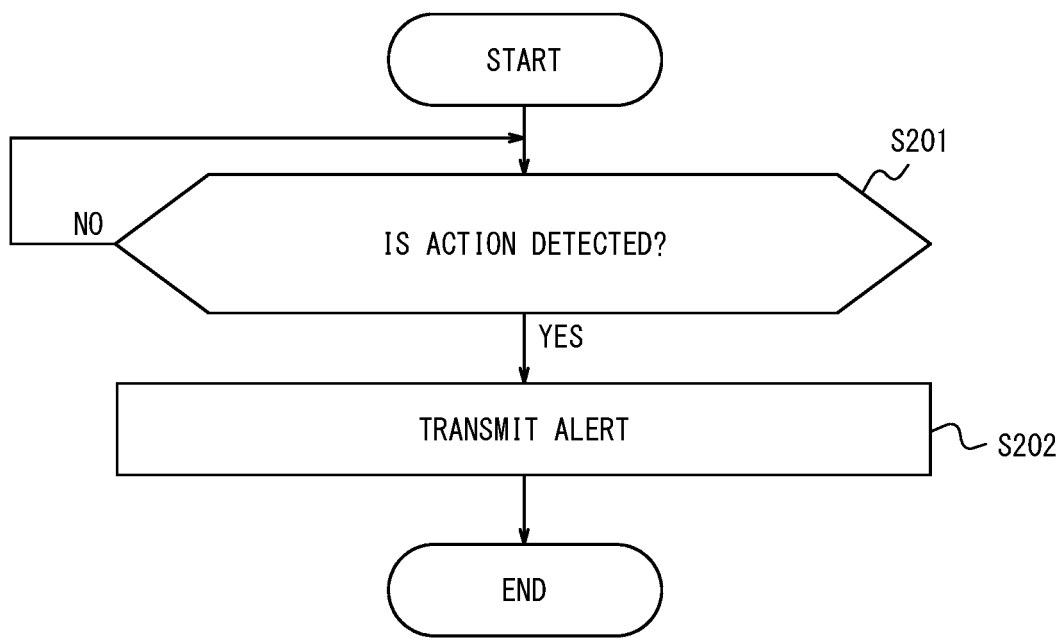
FIG. 6 is a flowchart illustrating operations of the control apparatus according to a variation of the embodiment of the present disclosure.

Operations of the control apparatus 20 according to this variation will be described with reference to FIG. 6.

When an action Ax on the vehicle 11 is performed by a person Px who does not hold a key for unlocking a door of the vehicle 11, in step S201, the communication interface 23 of the control apparatus 20 receives notification data D8 from the in-vehicle apparatus 30. The notification data D8 is data notifying that the action Ax has been performed. The action Ax may be any action, but in the present embodiment, the action Ax includes touching a doorknob of the vehicle 11 more times than a threshold. The threshold is, for example, 3. The person Px is, for example, a resident of a house in front of which the vehicle 11 is parked. The controller 21 of the control apparatus 20 detects the action Ax by acquiring the notification data D8 received by the communication interface 23.

In step S202, the controller 21 of the control apparatus 20 controls the communication interface 23 to transmit an alert. The communication interface 23 transmits the alert to the terminal apparatus 40. The terminal apparatus 40 receives the alert from the control apparatus 20. The terminal apparatus 40 presents the received alert to the owner 13 of the vehicle 11. Specifically, the terminal apparatus 40 displays an alert message on a display. Alternatively, the terminal apparatus 40 outputs an alert message or an alert sound from a speaker.

The present disclosure is not limited to the embodiment described above. For example, two or more blocks described in the block diagrams may be integrated, or a block may be divided. Instead of executing two or more steps described in the flowcharts in chronological order in accordance with the description, the steps may be executed in parallel or in a different order according to the processing capability of the apparatus that executes each step, or as required. Other modifications can be made without departing from the spirit of the present disclosure.

For example, the process in step S102 of FIG. 4 may be omitted. The process in step S103 may be omitted. In step S104, the instruction data D6 need not be generated. That is, in step S105, the instruction data D6 need not be outputted.

For example, the control apparatus 20 may be included in the vehicle 11. In that case, some of the operations of the in-vehicle apparatus 30 may be performed by the control apparatus 20. The in-vehicle apparatus 30 may be integrated with the control apparatus 20.

The invention claimed is:

1. A control apparatus comprising a controller configured to:
upon detecting parking of a vehicle at a spot where parking is prohibited, generate control data for controlling the vehicle to prevent a state of the vehicle from transitioning to a state in which a power source of the vehicle is stopped and an occupant of the vehicle is out of the vehicle; and
output the generated control data
wherein the control data includes an instruction to disable an operation for stopping the power source or an instruction to lock a seat belt of the vehicle.

2. The control apparatus according to claim 1, wherein the control data includes an instruction to lock a door of the vehicle.

3. The control apparatus according to claim 1, wherein the controller is configured to:
upon detecting parking of the vehicle at the spot, refer to permission data indicating whether the parking is previously permitted for the vehicle; and
output the control data in a case in which the parking is not previously permitted for the vehicle.

4. The control apparatus according to claim 1, wherein the controller is configured to:
upon detecting parking of the vehicle at the spot and acquiring authentication data inputted by the occupant, perform authentication using the acquired authentication data; and
output the control data in a case in which the authentication fails.

5. The control apparatus according to claim 1, wherein the controller is configured to, upon detecting parking of the vehicle at the spot, further output instruction data instructing that an alert be presented from the vehicle to outside.

6. The control apparatus according to claim 1, further comprising a communication interface configured to communicate with a terminal apparatus,
wherein the controller is configured to, upon detecting an action on the vehicle by a person who does not hold a key for unlocking a door of the vehicle, control the communication interface to transmit an alert.

7. The control apparatus according to claim 6, wherein the action includes touching a doorknob of the vehicle more times than a threshold.

8. A system comprising:
the control apparatus according to claim 1; and
an in-vehicle apparatus configured to receive the control data from the control apparatus and control the vehicle based on the control data.

9. A vehicle comprising the control apparatus according to claim 1.

10. A control apparatus comprising a controller configured to:
upon detecting parking of a vehicle at a spot where parking is prohibited, generate control data for controlling the vehicle to prevent a state of the vehicle from transitioning to a state in which a power source of the vehicle is stopped and an occupant of the vehicle is out of the vehicle;
upon detecting parking of the vehicle at the spot, refer to permission data indicating whether the parking is previously permitted for the vehicle; and
output the generated control data in a case in which the parking is not previously permitted for the vehicle.

11. A system comprising:
the control apparatus according to claim 10; and an in-vehicle apparatus configured to receive the control data from the control apparatus and control the vehicle based on the control data.

12. A vehicle comprising the control apparatus according to claim 10.

13. A control apparatus comprising a controller configured to:
upon detecting parking of a vehicle at a spot where parking is prohibited, generate control data for controlling the vehicle to prevent a state of the vehicle from transitioning to a state in which a power source of the vehicle is stopped and an occupant of the vehicle is out of the vehicle;
upon detecting parking of the vehicle at the spot and acquiring authentication data inputted by the occupant, perform authentication using the acquired authentication data; and
output the generated control data in a case in which the authentication fails.

14. A system comprising:
the control apparatus according to claim 13; and
an in-vehicle apparatus configured to receive the control data from the control apparatus and control the vehicle based on the control data.

15. A vehicle comprising the control apparatus according to claim 13.

* * * * *